United States Patent
Haynes et al.

(10) Patent No.: US 6,442,591 B1
(45) Date of Patent: Aug. 27, 2002

(54) METHOD AND SYSTEM FOR AUTOMATIC ELECTRONIC MAIL ADDRESS MAINTENANCE

(75) Inventors: Thomas Richard Haynes, Apex; Christopher Kemp Hunt, Raleigh; Jerry Thomas Paradise, Durham, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/185,254

(22) Filed: Nov. 2, 1998

(51) Int. Cl.$^7$ ................................................ G06F 15/16
(52) U.S. Cl. ...................... 709/206; 709/200; 709/204; 709/245
(58) Field of Search ................................ 709/206, 245, 709/204, 200

(56) References Cited

U.S. PATENT DOCUMENTS

| | | | |
|---|---|---|---|
| 5,408,333 A | | 4/1995 | Kojima et al. |
| 5,483,352 A | | 1/1996 | Fukuyama et al. |
| 5,563,881 A | | 10/1996 | Perelman et al. |
| 5,632,011 A | | 5/1997 | Landfield et al. |
| 5,632,018 A | | 5/1997 | Otorii |
| 5,689,671 A | | 11/1997 | Stromberg |
| 5,742,769 A | * | 4/1998 | Lee et al. ................... 709/206 |
| 5,752,059 A | | 5/1998 | Holleran et al. |
| 5,938,725 A | * | 8/1999 | Hara ........................... 709/206 |
| 5,961,620 A | * | 10/1999 | Trent et al. .................. 710/105 |
| 5,974,448 A | * | 10/1999 | Yamauchi et al. .......... 709/206 |
| 6,052,442 A | * | 4/2000 | Cooper et al. ............ 379/88.19 |
| 6,081,827 A | * | 6/2000 | Reber et al. ................. 709/200 |
| 6,108,704 A | * | 8/2000 | Hutton et al. ............... 709/227 |
| 6,157,706 A | * | 12/2000 | Rachelson ............. 379/100.08 |

FOREIGN PATENT DOCUMENTS

JP   11122415   *   4/1999

* cited by examiner

*Primary Examiner*—Ario Etienne
(74) *Attorney, Agent, or Firm*—J. Bruce Schelkopf; Andrew J. Dillon

(57) ABSTRACT

A method and system for automatic electronic mail address maintenance in a data processing system coupled to an electronic mail distribution system. An electronic mail processing application is utilized to process electronic mail transferred to or received from the electronic mail distribution system. Each time an electronic mail item is processed within the electronic mail processing application, electronic mail addresses are automatically retrieved and stored within the data processing system. Group or alias address are resolved by automatically accessing the electronic mail distribution system to obtain the appropriate electronic mail address. The retrieved electronic mail addresses may then be displayed by a user together with or separate from an existing address list. These automatically retrieved electronic mail addresses may then be viewed alphabetically, in data sequence or by frequency of transmission or receipt to or from designated electronic mail addresses.

17 Claims, 4 Drawing Sheets

METHOD AND SYSTEM FOR AUTOMATIC ELECTRONIC MAIL ADDRESS MAINTENANCE

BACKGROUND OF THE INVENTION

1. Technical Field

The present invention relates in general to improved electronic mail distribution systems and in particular to an improved method and system for retrieving and storing electronic mail addresses. Still more particularly, the present invention relates to a method and system for automatically retrieving and storing electronic mail addresses from electronic mail items transferred to or received from an electronic mail distribution system.

2. Description of the Related Art

Many organizations interconnect private networks at various cities utilizing a public network in order to provide data transfer between private networks. For example, an organization having multiple geographic cites may allow electronic mail to be transmitted between the cites through the interconnection of the networks which is commonly referred to as the "Internet." The Internet requires TCP/IP addressing but allows for system level and user level aliases to be utilized in order to provide a more intuitive addressing of messages. An organization must maintain its database of aliases to ensure the proper delivery of electronic mail message traffic within that organization.

Such electronic mail systems may interconnect personal computers and data terminals in a communications network in order to transmit messages as mail. There are, in addition to the Internet, various electronic mail systems for exchanging messages as electronic mail through various media. For example, communication systems are often utilized as the parent bodies for voice mail systems, facsimile mail systems, etc., while computer systems are typically utilized as the parent bodies for so-called electronic mail systems utilizing encoded characters such as text mail, personal computer communication systems, etc.

As computer networks have become more complex and complicated, so too have the addresses for electronic mail. Addresses for different types of electronic mail systems often require different syntaxes for specifying the necessary information. A syntax specifies how the pieces of information comprising the electronic mailing addresses are to be utilized and expressed. If a user departs from a given syntax utilized by that particular computer mail system, the electronic mail item will not reach its intended recipient. Mail systems differ both in the information they require as part of an address and the manner in which that information must be specified. Thus, when a user wishes to send an electronic mail, the user must not only know the destination address, but also the proper syntax for that computer network.

In view of the increased complexity of electronic mail addresses, many current electronic mail applications maintain an address list which is generated by a user who manually enters the electronic mail addresses which are most often utilized. This address list can be compared to the speed dial feature on telephones where the most utilized or emergency numbers are programmed into the telephone for later use. Like the speed dial feature on a telephone, the address list requires the user to enter data manually, which may take some time. Many organizations seek to reduce this time and improve communication between their employees by providing a company-wide address list. This method helps but with larger companies the list can become quite large and a substantial period of time to locate and identify a particular address. Thus, electronic mail users in the modern computer world generally address electronic mail by either remembering the address to which they wish to send a mail item, searching through a personal address list or searching through a pre-made address list for a particular organization.

Additionally, users often maintain so called "alias" lists which include a more intuitive name for an individual or a group of individuals which is then automatically decoded by the electronic mail distribution system into appropriate electronic mail addresses. While this technique provides an increased level of facility in replying to electronic mail messages or transmitting messages to groups or individuals designated with an alias by the user, this technique often results in increased complexity when a user is attempting to transmit a new electronic mail item to an individual only known to the sender by an alias which may not be present within that user's address list.

It should therefore be apparent that a need exists for a method and system whereby electronic mail addresses may be automatically and efficiently maintained within a computer system.

SUMMARY OF THE INVENTION

It is therefore one object of the present invention to provide an improved electronic mail distribution system.

It is another object of the present invention to provide an improved method and system for retrieving and storing electronic mail addresses.

It is yet another object of the present invention to provide an improved method and system for automatically retrieving and storing electronic mail addresses from electronic mail items which are transferred to or received from an electronic mail distribution system.

The foregoing objects are achieved as is now described. A method and system are disclosed for automatic electronic mail address maintenance in a data processing system which is coupled to an electronic mail distribution system. An electronic mail processing application is utilized to process electronic mail transferred to or received from the electronic mail distribution system. Each time an electronic mail item is processed within the electronic mail processing application, electronic mail addresses are automatically retrieved and stored within the data processing system. Group or alias address are resolved by automatically accessing the electronic mail distribution system to obtain the appropriate electronic mail address. The retrieved electronic mail addresses may then be displayed by a user together with or separate from an existing address list. These automatically retrieved electronic mail addresses may then be displayed alphabetically, in data sequence or by frequency of transmission or receipt to or from designated electronic mail addresses.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
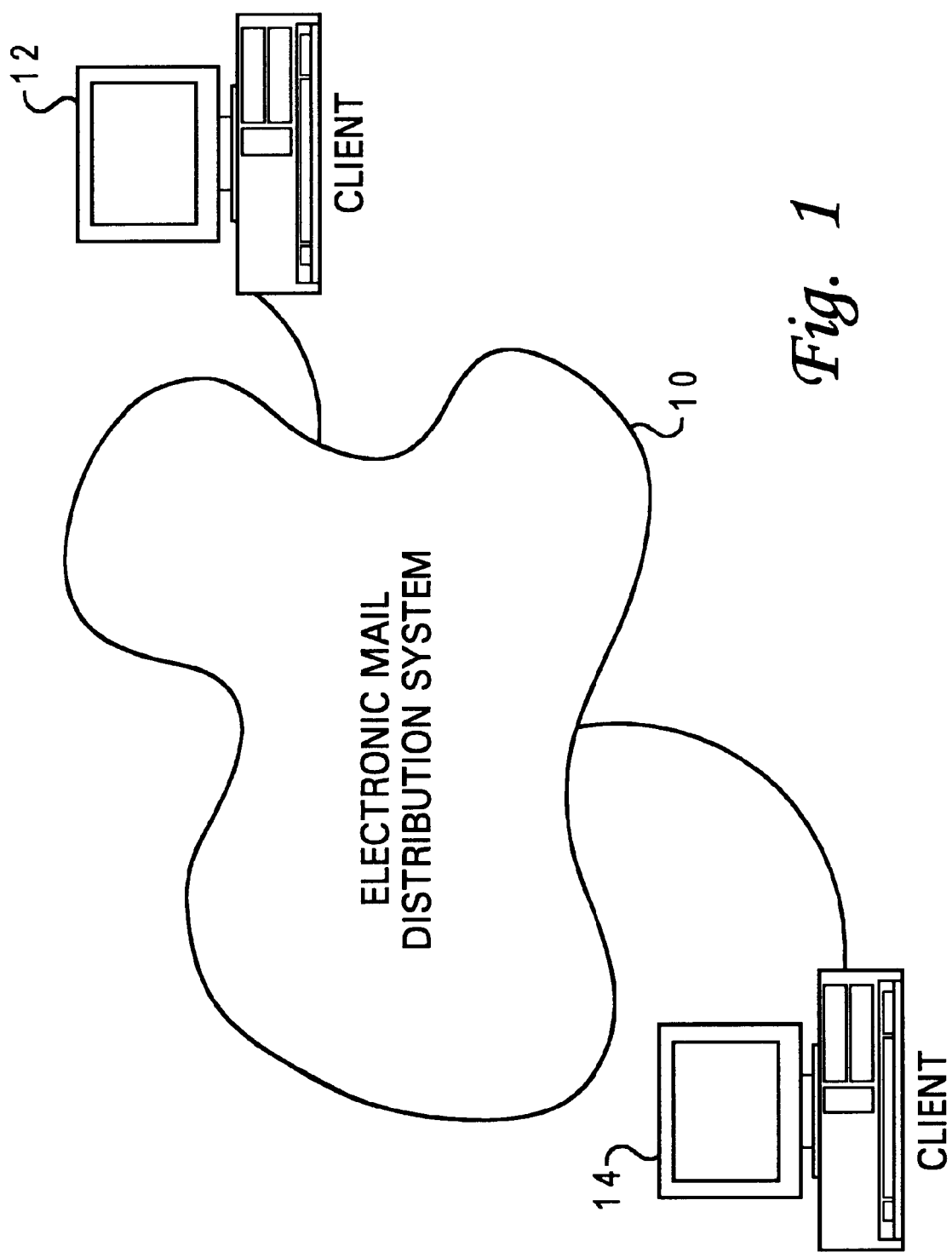
FIG. 1 is a partially schematic pictorial view of an electronic mail distribution system which may be utilized with the method and system of the present invention.

With reference now to the figures and in particular with reference to FIG. 1, there is depicted a partially schematic pictorial view of an electronic mail distribution system 10 which may be utilized in accordance with the method and system of the present invention. As depicted, multiple clients 12 and 14 may be coupled to electronic mail distribution system 10 in order to transmit and receive electronic mail messages throughout a widely distributed system. As described above, electronic mail distribution system 10 may comprise the so-called "Internet" or any other suitable electronic mail distribution system which may be within the public domain or restricted to use within a large corporate entity.

Figure 2:
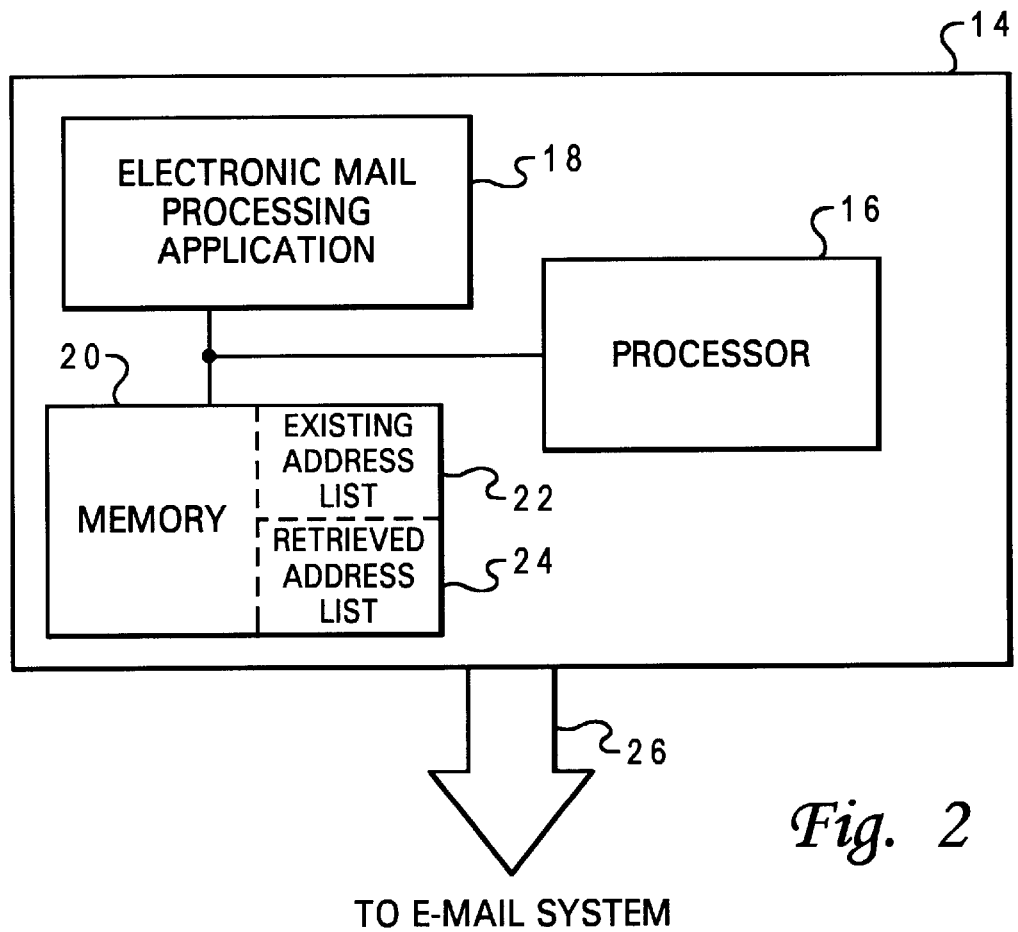
FIG. 2 is a high-level block diagram of a client within the electronic mail distribution system of FIG. 1.

Referring now to FIG. 2 there is depicted a high-level block diagram of a client 14 within electronic mail distribution system 10 of FIG. 1. As depicted, client 14 may comprise a personal computer or data terminal and includes a processor 16 for executing the process of the present invention, as well as other data processing applications. Electronic mail processing application 18 is depicted within client 14 and is utilized as an interface between client 14 and electronic mail distribution system 10 to transmit and receive electronic mail items.

Memory 20 is depicted within client 14 and, as those skilled in the art will appreciate, may comprise random access memory, magnetic storage media or any other suitable storage media within which electronic data may be temporarily stored and retrieved. Stored within memory 20 are existing address list 22 and retrieved address list 24. As will be described in greater detail herein, existing address list 22 is typically an address list maintained by electronic mail processing application 18 in which the user has painstakingly typed addresses of those individuals to whom electronic mail is frequently transmitted. As is typical in such situations an intuitive "nickname" or "alias" is often utilized and thus, the user may simply address an electronic mail item to "Tom" and electronic mail processing application 18 will, in conjunction with existing address list 22, convert the name "Tom" into an appropriate electronic mail address.

While retrieved address list 24 is depicted as physically separate from existing address list 22, those having skill in this art will appreciate that retrieved address list 24 may comprise a portion of existing address list 22 which may be merged therewith or which may be viewed separately by designating each of the address lists as a separate "view" of the list, in a manner common in these arts. As graphically depicted, client 14 is then connected to electronic mail distribution system 10 at reference numeral 26.

Figure 3:
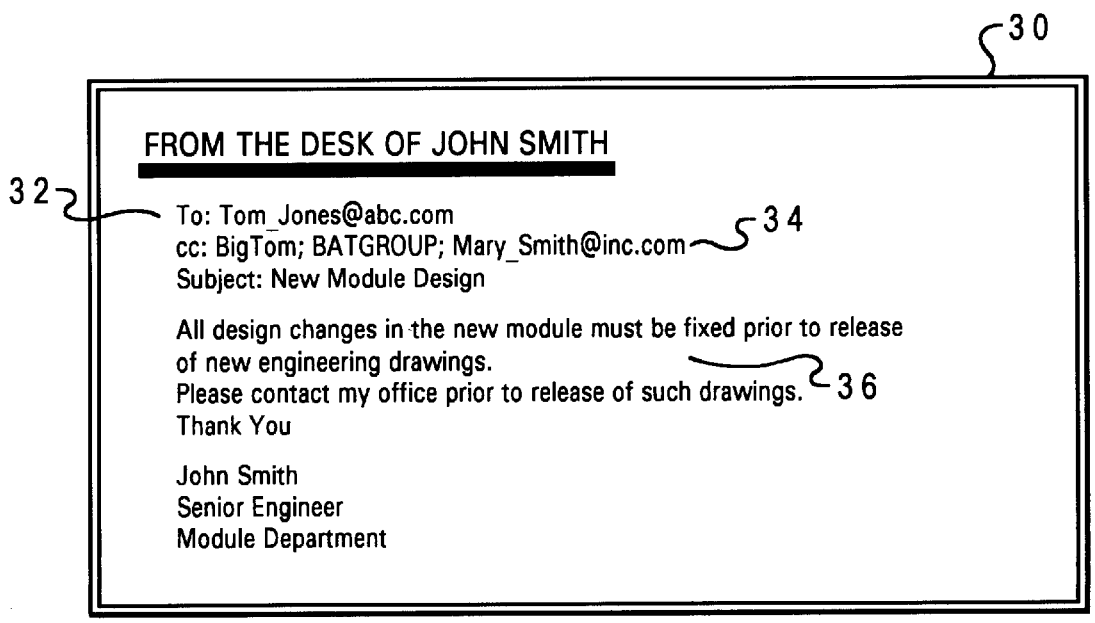
FIG. 3 is a pictorial representation of an electronic mail message which may be utilized with the method and system of the present invention.

Referring now to FIG. 3, there is depicted a pictorial representation of electronic mail message 30 which may be utilized with the method and system of the present invention. As illustrated, electronic mail message 30 has been transmitted from the desk of "John Smith" to primary recipient "Tom Jones" who has been designated by a traditional electronic mail address, as depicted at reference numeral 32. However, as depicted at reference numeral 34, the electronic message has also been copied to other individuals who may be designated by an individual "alias" or "group" designation, in addition to traditional electronic mail addressing. Thus, in the future, if the recipient of this electronic mail message wishes to correspond with one of the addressees within the message not designated by a traditional electronic mail address, the transmission may fail due to a failure of electronic mail processing application 18 within the client of this particular user to recognize the alias or group names set forth therein.

Figure 4:
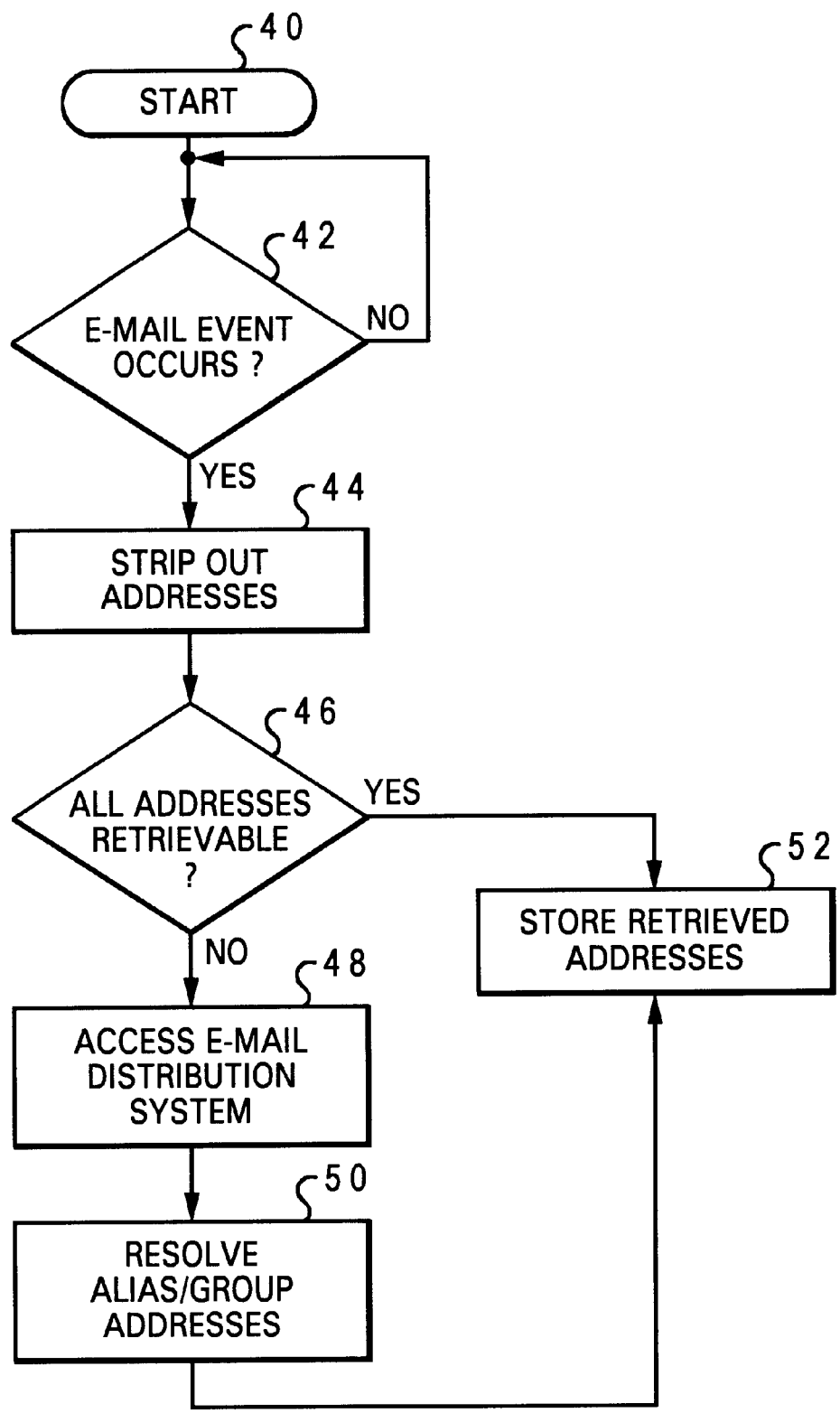
FIG. 4 is a high-level logic flowchart which illustrates automatic electronic mail address retrieval in accordance with the method and system of the present invention.

Referring now to FIG. 4, there is depicted a high-level logic flowchart which illustrates automatic electronic mail address retrieval in accordance with the method and system of the present invention in a manner which solves the problem noted above with respect to FIG. 3. As depicted, this process begins at block 40 and thereafter passes to block 42. Block 42 depicts a determination of whether or not an electronic mail "event" has occurred. That is, an electronic mail item has been transmitted to or received from electronic mail distribution system 10 (see FIG. 1). In the event an electronic mail event has not occurred the process merely iterates until such time as such an event occurs.

Still referring to block 42, in the event an electronic mail event has occurred, the process passes to block 44. Block 44 illustrates the automatic stripping out of all addresses from the electronic mail item. Thereafter, the process passes to block 46. Block 46 depicts a determination of whether or not all addresses within the electronic mail item are retrievable. As noted above, it is not uncommon for addressees within an electronic mail item to be designated by an alias or a group name and the electronic mail address for such individuals may not be immediately apparent. In the event all addresses within the electronic mail item are not retrievable, the process passes to block 48.

Block 48 illustrates the accessing of electronic mail distribution system 10 (see FIG. 1) and the process then passes to block 50. Block 50 illustrates the resolution of all alias/group addresses into appropriate electronic mail addresses and the process then passes to block 52. Block 52 illustrates the storing of the automatically retrieved electronic mail addresses such that the user may, at some time in the future, automatically retrieve and utilize those electronic mail addresses without requiring the user to indefinitely store all received or transmitted electronic mail messages in order to maintain address information.

Referring again to block 46, in the event all addresses within the electronic mail item were retrievable, the process passes directly to block 52 and the retrieved addresses are stored.

Figure 5:
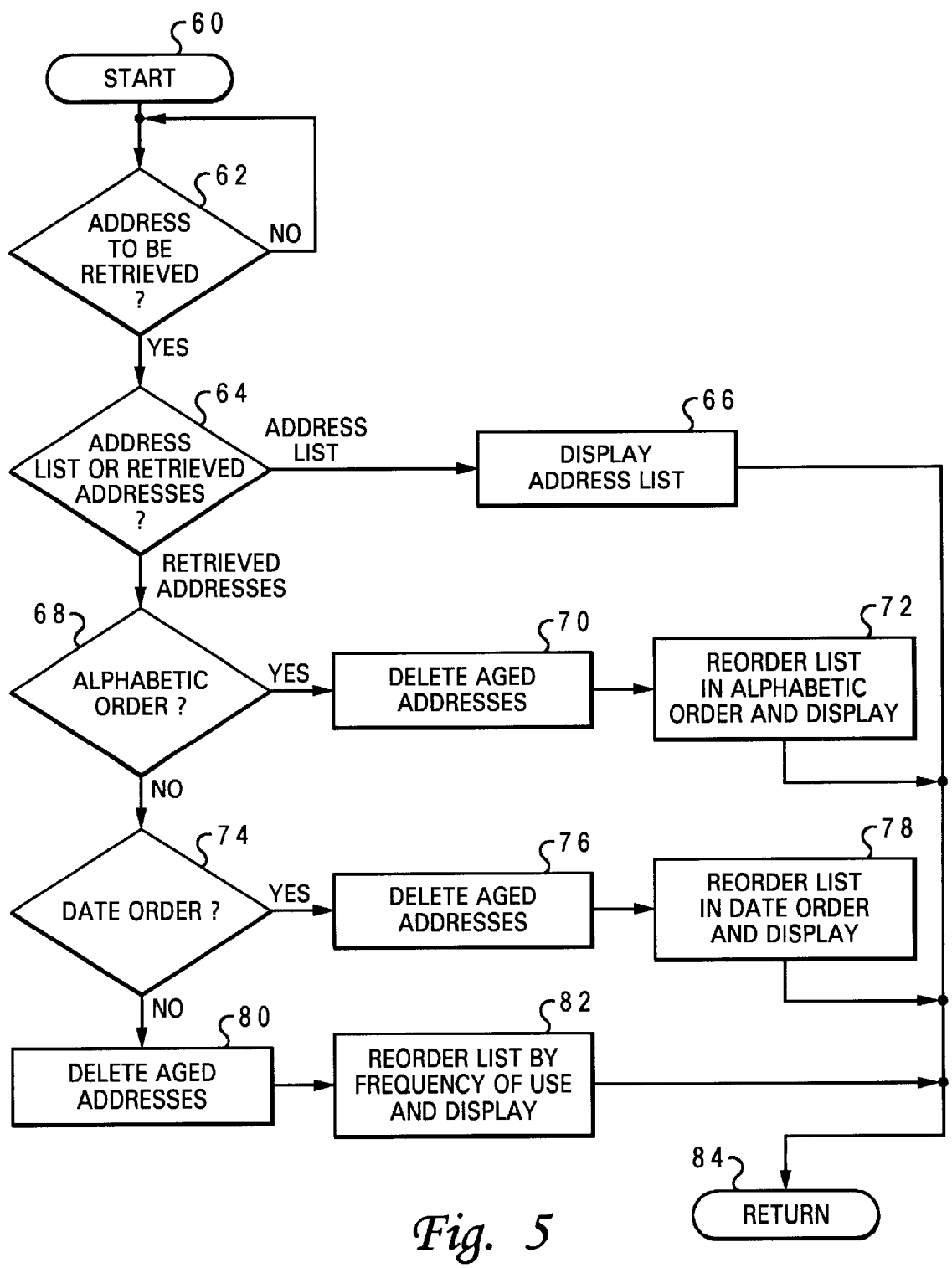
FIG. 5 is a high-level logic flowchart which illustrates the display of retrieved electronic mail addresses in accordance with the method and system of the present invention.

Finally, with reference to FIG. 5, there is depicted a high-level logic flowchart which illustrates the display of retrieved electronic mail addresses in accordance with the method and system of the present invention. As depicted, the process begins at block 60 thereafter passes to block 62. Block 62 depicts a determination of whether or not a user wishes to retrieve an electronic mail address from an address list. If not, the process merely iterates until such time as the user indicates the desire to retrieve an electronic mail address.

Still referring to block 62, in the event the user of client 14 (see FIG. 1) indicates the desire to receive an electronic mail address the process passes to block 64. Block 64 depicts a determination of whether or not the user desires to retrieve an address from the existing address list or from the retrieved addresses which were automatically stored in accordance with the method and system of the present invention. In the event the existing address list is designated, the process passes to block 66. Block 66 illustrates the display of the existing address list and the process then passes to block 84 and returns.

Referring again to block 64, in the event the user designates an address to be retrieved from the automatically retrieved address list, the process passes to block 68. Block 68 depicts a determination of whether or not the user has indicated the addresses are to be retrieved in alphabetical order and if so, the process passes to block 70. Block 70 depicts the optional deletion of aged addresses. That is, in accordance with one optional feature of the present invention, electronic mail addresses which have been retrieved in accordance with the method and system of the present invention may be deleted from the retrieved address list after a selected period of time has elapsed. This technique will prevent the retrieved address list from growing to a size where manipulation of that list becomes unwieldy. Next, the process passes to block 72. Block 72 illustrates the reordering of the retrieved address list into alphabetic order and the display of that list for the user. The process then passes to block 84 and returns.

Referring again to block 68, in the event the user has not designated an alphabetic order for display of the retrieved address list, the process passes to block 74. Block 74 depicts a determination of whether or not the user has specified date order of receipt or transmission for electronic mail items. If date order has been specified, the process passes to block 76. As noted above, block 76 depicts the optional deletion of aged addresses and the process then passes to block 78. Block 78 illustrates the reordering of the retrieved address list in date order and the display of the resultant list. Thereafter, the process passes to block 84 and returns.

Referring again to block 74, in the event the user does not designate data order for display of the retrieved address list, the process passes to block 80. Block 80 once again depicts the optional deletion of aged addresses, in accordance with an optional feature of the present invention, and the process thereafter passes to block 82. Block 82 depicts the reordering of the retrieved electronic mail address list by frequency of use and the display of that list. This display will result in a display of electronic mail addresses wherein the addresses which are most frequently found in electronic mail items transferred to or received from the electronic mail distribution system by this user will be listed at the top of the resultant retrieved address list, making it more efficient for the user to retrieve an address which is frequently utilized. The process then passes to block 84 and returns.

While the invention has been particularly shown and described with reference to a preferred embodiment, it will be understood by those skilled in the art that various changes in form and detail may be made therein without departing from the spirit and scope of the invention.

What is claimed is:

1. A method for efficient maintenance of electronic mail address resources in a data processing system coupled to an electronic mail distribution system, said method comprising the steps of:

processing electronic mail transferred to or received from an electronic mail distribution system utilizing an electronic mail processing application within said data processing system;

automatically retrieving electronic mail addresses from every electronic mail processed by said electronic mail processing application in response to said processing; and storing said automatically retrieved electronic addresses within said data processing system.

2. The method for efficient maintenance of electronic mail address resources in accordance with claim 1, wherein said electronic mail processing application includes an existing list of electronic mail addresses and wherein said step of storing said automatically retrieved electronic mail addresses within said data processing system comprises the step of storing said automatically retrieved electronic mail addresses within a list separate from said existing list.

3. The method for efficient maintenance of electronic mail address resources in accordance with claim 1, wherein said electronic mail processing application includes an existing list of electronic mail addresses and wherein said step of storing said automatically retrieved electronic mail addresses within said data processing system comprises the step of storing said automatically retrieved electronic mail addresses within a separate view of said existing list.

4. The method for efficient maintenance of electronic mail address resources in accordance with claim 1, further including the step of selectively displaying said automatically retrieved electronic mail addresses in alphabetical order.

5. The method for efficient maintenance of electronic mail address resources in accordance with claim 1, further including the step of selectively displaying said automatically retrieved electronic mail addresses in date order.

6. The method for efficient maintenance of electronic mail address resources in accordance with claim 1, further including the step of selectively displaying said automatically retrieved electronic mail addresses in an order determined by frequency of receipt or transfer of electronic mail from or to selected addresses.

7. The method for efficient maintenance of electronic mail address resources in accordance with claim 1, wherein said step of automatically retrieving electronic mail addresses from every electronic mail processed by said electronic mail processing application in response to said processing comprises the step of automatically querying said electronic mail distribution system in order to retrieve electronic mail addresses corresponding to alias addressee designations.

8. The method for efficient maintenance of electronic mail address resources in accordance with claim 1, further including the step of deleting an automatically retrieved and stored electronic mail address following elapse of a selected period of time.

9. A system for efficient maintenance of electronic mail address resources in a data processing system coupled to an electronic mail distribution system, said system comprising:

an electronic mail processing application within said data processing system for processing electronic mail transferred to or received from said electronic mail distribution system;

means for automatically retrieving electronic mail addresses from every electronic mail processed by said electronic mail processing application in response to said processing; and means for storing said automatically retrieved electronic addresses within said data processing system.

10. A system for efficient maintenance of electronic mail address resources in accordance with claim 9, further including an existing list of electronic mail addresses within said electronic mail processing application.

11. A system for efficient maintenance of electronic mail address resources in accordance with claim 10, wherein said means for storing said automatically retrieved electronic mail addresses within said data processing system comprises a means for storing said automatically retrieved electronic mail addresses within a list separate from said existing list.

12. A system for efficient maintenance of electronic mail address resources in accordance with claim 10, wherein said means for storing said automatically retrieved electronic mail addresses within said data processing system comprises a means for storing said automatically retrieved electronic mail addresses within a separate view of said existing list.

13. A system for efficient maintenance of electronic mail address resources in accordance with claim 9, further including means for selectively displaying said automatically retrieved electronic mail addresses in alphabetical order.

14. A system for efficient maintenance of electronic mail address resources in accordance with claim 9, further including means for selectively displaying said automatically retrieved electronic mail addresses in date order.

15. A system for efficient maintenance of electronic mail address resources in accordance with claim 9, further including means for selectively displaying said automatically retrieved electronic mail addresses in an order determined by frequency of receipt or transfer of electronic mail from or to selected addresses.

16. A system for efficient maintenance of electronic mail address resources in accordance with claim 9, wherein said means for automatically retrieving electronic mail addresses from every electronic mail processed by said electronic mail processing application in response to said processing comprises means for automatically querying said electronic mail distribution system in order to retrieve electronic mail addresses corresponding to alias addressee designations.

17. A system for efficient maintenance of electronic mail address resources in accordance with claim 9, further including means for deleting an automatically retrieved and stored electronic mail address following elapse of a selected period of time.

\* \* \* \* \*